Aug. 3, 1948.
A. O. TAYLOR
2,446,441
CARGO AIRPLANE
Filed Nov. 7, 1944
3 Sheets-Sheet 1
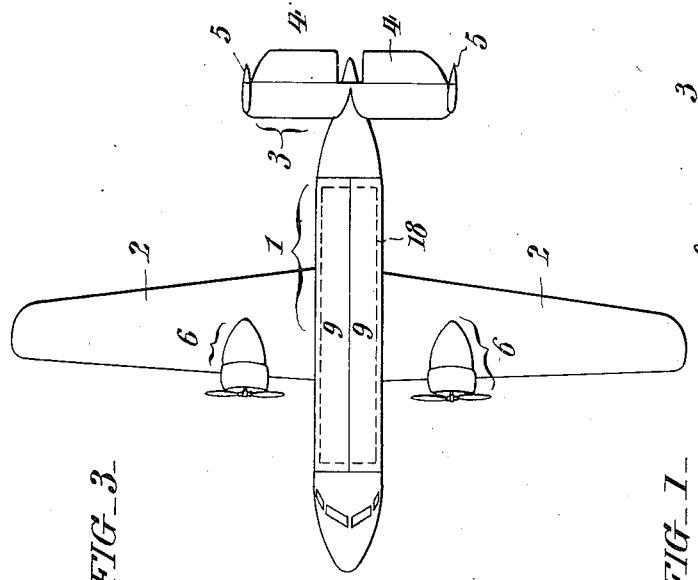
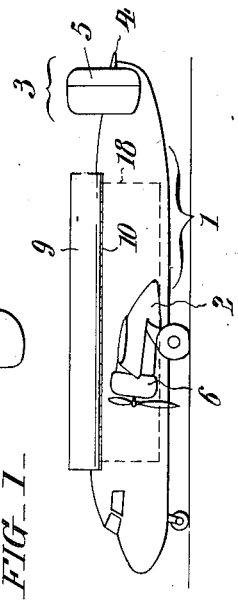
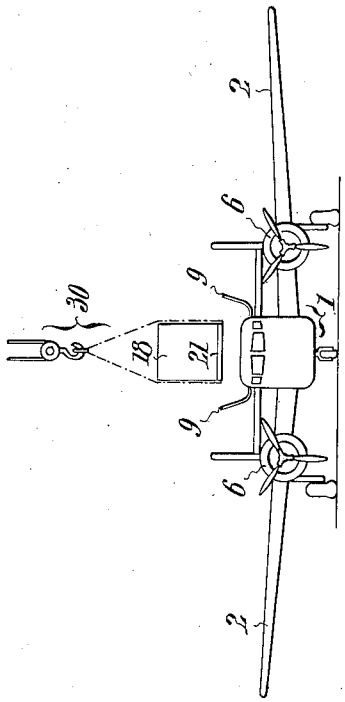
INVENTOR:
Alanson O. Taylor,
BY
Paul & Paul
ATTORNEYS.

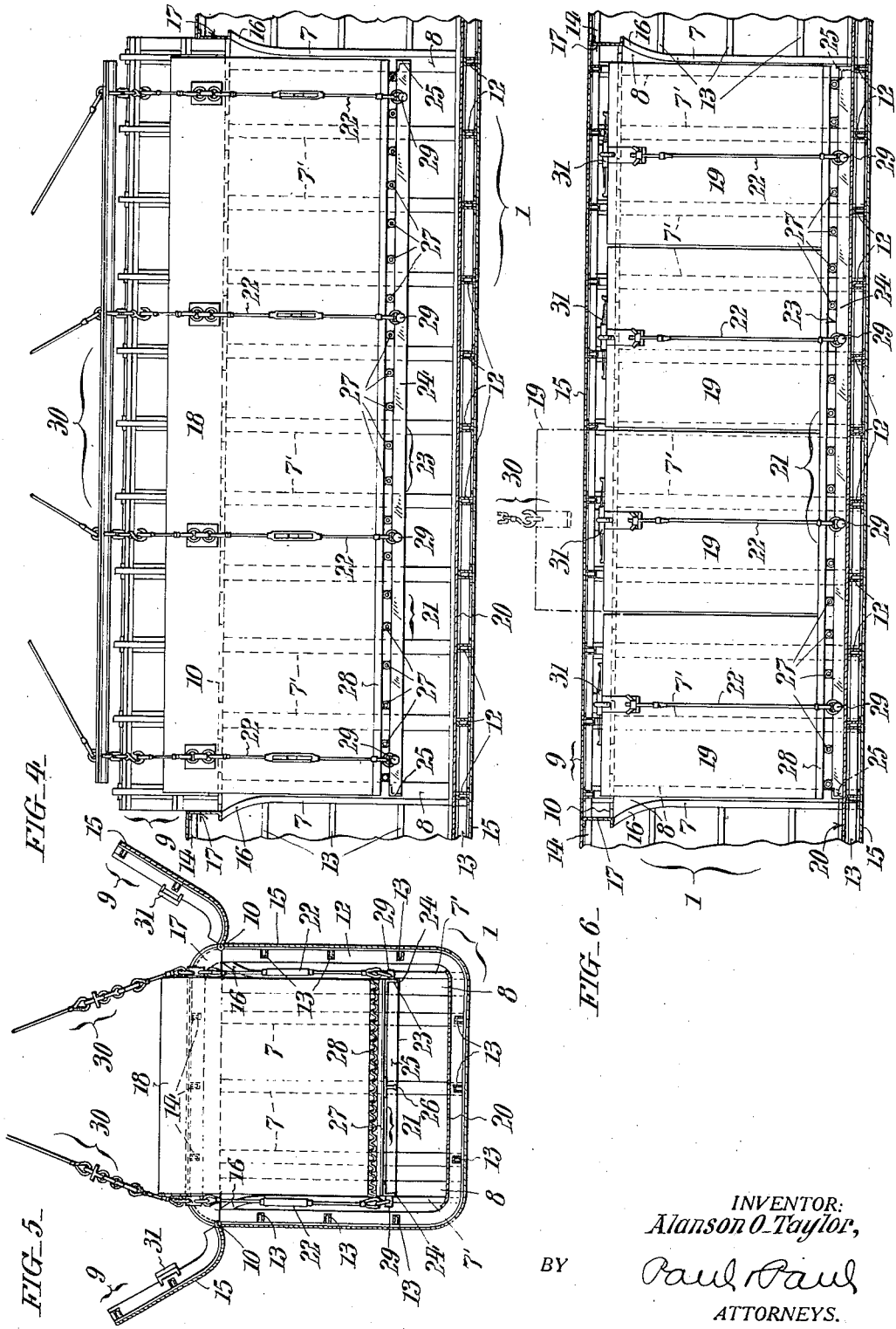

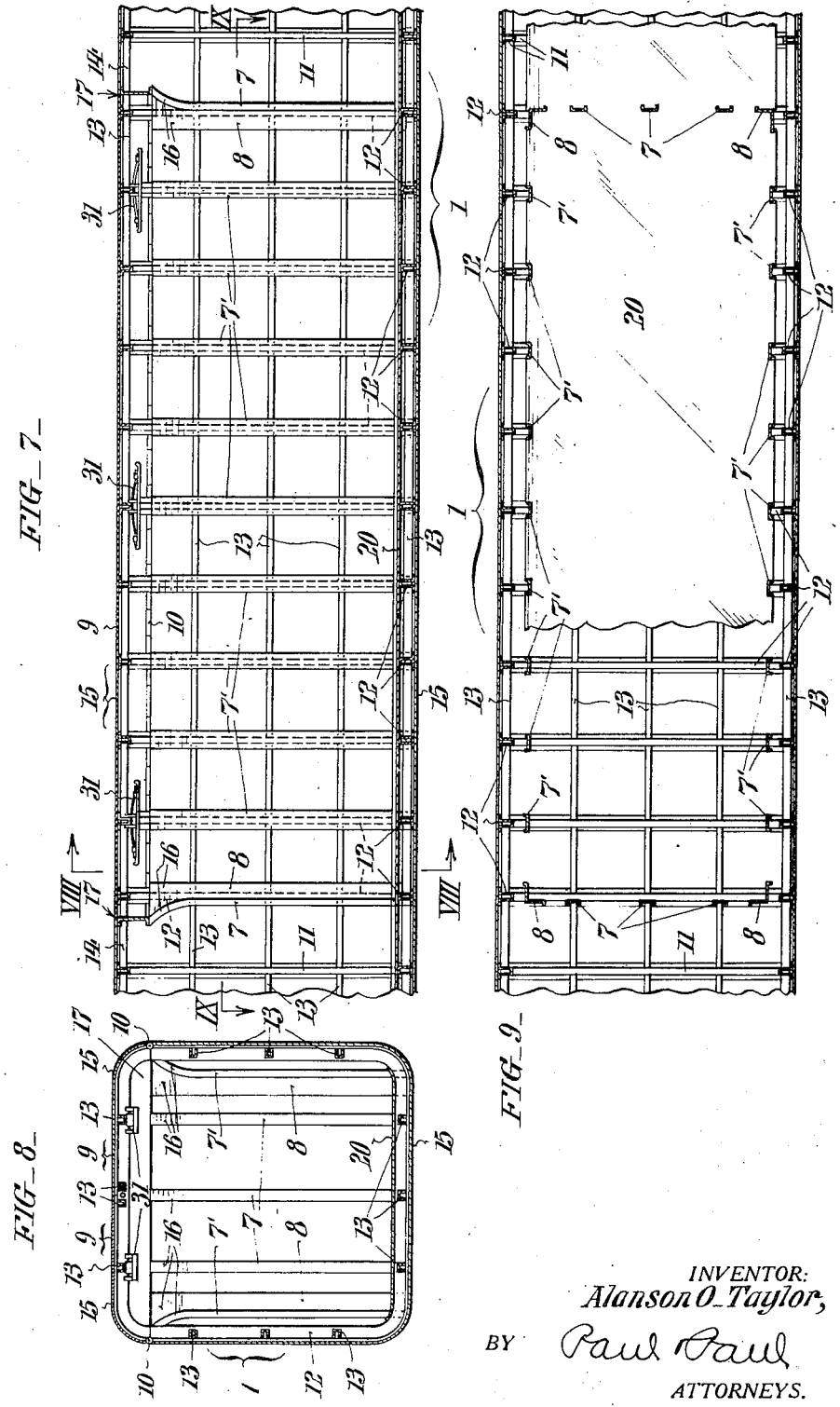

Patented Aug. 3, 1948

2,446,441

UNITED STATES PATENT OFFICE 2,446,441

CARGO AIRPLANE

Alanson O. Taylor, Lansdowne, Pa.

Application November 7, 1944, Serial No. 562,284

10 Claims. (Cl. 244—137)

1

This invention relates to airplanes intended for use in cargo transport and has reference more particularly to cargo planes in which the cargo spaces are located centrally of the fuselages and are accessible for loading and unloading from above.

The primary object of this invention is to provide a cargo transport airplane with an opening in the top for passage into or removal therefrom of a C. L. (capacity load) or a P. L. (plane load) container, or a series of aligned L. C. L. (less than capacity load) containers which are positioned and stabilized longitudinally and laterally of the airplane, in conjunction with a cover means effective to close the fuselage opening and simultaneously secure the container or containers against vertical displacement.

Another object of the invention is to reinforce the airplane in the region where the cargo container or containers are located and to prevent the impartation of concentrated injurious strain or strains to other parts of the airplane; said reinforcement being conveniently effected by guide means for the entry and withdrawal of the cargo container or containers disposed in spacial relation to the conventional shell supporting ribs.

A further object is to effectively prevent the shifting of the cargo container or containers and providing each such container or containers with a skid-like base or shallow underframe construction upon which the load is sustained.

While the foregoing definitions are indicative, in a general way, of the main objectives of this invention, others with ancillary advantages will be evident to those conversant with the art upon a full understanding of the construction, arrangement and operation of the means hereinafter disclosed; but it will also be appreciated that the invention is susceptible of other embodiments and adaptations, or structurally modified forms, coming equally within the terms and scope of the concluding claims.

In the accompanying drawings:

Figs. 1 and 2, respectively, show a side elevation and a front end view of a cargo plane conveniently embodying this invention, with the top hatch of the fuselage open to receive the lading.

Fig. 3 shows the plane in top plan with the hatch closed.

Fig. 4 is a fragmentary view on a larger scale showing the medial portion of the fuselage in vertical longitudinal section, with the hatch open, and the container being lowered into position therein.

2

Fig. 5 is an end view, looking from the left of Fig. 4 towards the right-hand thereof.

Fig. 6 is a view similar to Fig. 4 with the container seated in position, and the hatch closed.

Fig. 7 is a fragmentary longitudinal section, somewhat similar to Fig. 6, and showing the means adapted for reception and removal of a single full capacity cargo container as well as indicating preferred means for securing the container against vertical displacement during flight of the plane.

Fig. 8 is a cross-section on the plane VIII—VIII of Fig. 7; and,

Fig. 9 is a plan section taken approximately as indicated by the angled-arrows IX—IX in Fig. 7.

In describing the form of this invention, as exemplified in the drawings herewith, specific terms will be used for the sake of clarity, but it is to be understood the scope of said invention is not thereby limited; each such term being intended to embrace all equivalents which perform the same function for an analogous purpose.

Except as hereinafter particularly pointed out, the airplane illustrated by way of example in Figs. 1-3 may be generally of standard design and construction. As shown, the airplane has an elongate fuselage 1 preferably of square cross-sectional configuration from which the main or lift wings 2 extend laterally approximately at the central region, and at the rear end of which is a tail structure 3 with pivoted horizontal and vertical vanes 4 and 5 for controlling the direction of flight. The airplane is powered by two propeller units each designated by the numeral 6, and shown as mounted at the forward edges of the lift wings 2 at points equidistant from the fuselage 1.

In accordance with the present invention, the mid-portion of the fuselage 1 is preferably set apart by transversely and longitudinally spaced bracing or guide bars 7, 7', respectively, of channel section, as well as corner angles 8, all of which jointly serve to define a hold or cargo space for reception of the C. L. container which is to be transported. In this instance, the hold or cargo space is provided with a cover composed of two sections 9, 9, which are individually connected by longitudinally-extending hinges 10, Figs. 5 and 6, to opposite sides of the fuselage 1 and which meet in the longitudinal center of the top of said fuselage when closed.

It will now be noted that the fuselage 1 has a skeleton framework composed of suitably spaced ribs 11, 12, and similarly spaced connecting horizontals 13 and 14 to which the cover shell 15 is permanently attached. The ribs 11 in the portions of the fuselage fore-and-aft of the cargo compartment are in ring form and extend perimetrically of the fuselage 1, while the ribs 12 are U-shaped and extend only across the bottom and up the sides of said compartment. The horizontals 13 extend throughout the length of the fuselage at the bottom and sides and connect with the ribs 11 as well as with the ribs 12. The horizontals 14, on the other hand, serve to support the roof portion of the shell 15 fore-and-aft of the cargo compartment and connect only with the ribs 11, 12 and the longitudinals 13 and 14 are in practice, preferably fashioned from sheet metal to channel cross-section and are permanently united at the regions of overlap preferably by welding.

The bracing or guide bars 7, 7' have their upper portions outwardly flared at 16 to engage the lower flange of a channel-section forming the hatch-way 17, see Figs. 4–6 and 7 to best advantage, about the opening in the fuselage 1.

Referring now to Figs. 4 and 5 more particularly, it will be observed that the cargo-space is occupied by a C. L. container 18—for long distance transport—which accurately engages in the space defined by the guide bars 7, 7' and corner angles 8; whereas in Fig. 6 there is illustrated the adaptation of said defined space by an aligned series or multiplicity of smaller L. C. L. containers 19—convenient for local delivery freight—each of which corresponds in width with the width of the C. L. container 18, while the length thereof, or fore-and-aft, relative to the longitudinal median of the fuselage 1 is a definite multiple of the cargo-space lengthwise of the latter. In other words, the containers 19 have a lengthwise effective dimension, of the over all longitudinal dimension of the container 18.

It is to be further noted that the container 18, or containers 19, is—or are—conveniently arranged to seat on the deck 20, Figs. 7–9; or use may be made of an intervening supporting means 21, Figs. 4–6, provided with adjustable shackle devices 22 for holding the same rigidly in place, or in aligned assembly, respectively. The supporting means 21 preferably comprises a base frame 23 including angle-section sides and ends 24, 25, respectively, with a central lengthwise stiffener 26; and it is of a size to conform with that of the bottom of the container 18, or containers 19. Mounted on and secured to the base frame 23 are spaced transverse stiffeners 27, in turn supporting a sheet-material top 28. Anchoring means 29 are provided at determined intervals on the sides 24, of the frame 23 for coupling thereto of the lower ends of the shackle devices 22, aforesaid; while said frame 23 and the sustained container 18, or containers 19, are raised and lowered by an appropriate tackle, comprehensively marked 30, from an overhead traveling crane or the like—not shown, in an obvious manner. Incidentally, use of the supporting means 21 enables the container 18 or 19 being made of much lighter gauge material than heretofore, inasmuch as the load is supported on said means 21; or the means 21 may form the bottom of the respective container 18, 19 with corresponding advantage.

In order that the cover sections 9 may effectively prevent any vertical displacement of the container 18 or containers 19 during transport in the airplane, said sections are provided at definite locations with any suitable spring-influenced, downwardly-effective, movement-restraining devices 31, that engage on the top of the container 18 or containers 19 when the cover sections 9 are closed down and locked. Obviously the cover sections are provided with suitable sealing medium thereabout for preventing the ingress of atmospheric elements which might adversely affect the content of the cargo-space.

Having thus described my invention, I claim:

1. A cargo airplane including a fuselage with a cargo space having an opening in the top for passage thereinto or removal therefrom of a capacity load or plane load container, guide means below the opening defining the effective width and length of the cargo space and accurately engaging the sides and ends of the container whereby when lowered into said space it is stabilized laterally and longitudinally, cover means closing the fuselage opening, and movement-restraining devices dependent from said cover means effective to restrain the container against vertical displacement.

2. A cargo airplane including a fuselage with a cargo space having an opening in the top for passage thereinto or removal therefrom of a capacity load or plane load container; guide means below the opening defining the effective width and length of the cargo space and accurately engaging the sides and ends of the container whereby, when lowered, it is stabilized laterally and longitudinally; cover means closing the fuselage opening, and said cover means having definitely located downwardly-effective devices which, when the fuselage opening is closed, engage upon the top of the container and secure it against vertical displacement.

3. A cargo airplane including a fuselage with a cargo space having an opening in the top and a movable closure therefor, said opening enabling passage into or removal from the cargo space of a capacity load or plane load size container, the width and length of said cargo space corresponding to the width and length of said container and the depth of said cargo space when the airplane top is closed corresponding to the depth of the container, and guide means of suitable bar sections below the opening which limit the effective width and length of the cargo space and accurately engage the sides, ends and vertical corners of the container as it is lowered into place through the opening.

4. A cargo airplane including a fuselage with a cargo space having an opening in the top with a movable cover, said opening permitting passage into or removal from the cargo space of a capacity load container or a series of less than capacity load or plane load size containers, the width and length of said cargo space corresponding to the width and length of the container or the aggregate length of the less than capacity load containers, and the depth of said cargo space when the top cover is closed corresponding to the depth of the container or series of less than capacity load containers, guide means below the opening in the top of the fuselage which limit the effective width and length of the cargo space and accurately engage the sides and ends of the container or containers as it or they is or are lowered into place through the opening, the effective length of the cargo space being controlled by stop means defining a space which corresponds with the lengthwise dimension of the capacity load container and the over-all corresponding dimension of the less than capacity load containers.

5. A cargo airplane as defined in claim 1 wherein the series of aligned less than capacity load or less than plane load containers are interchangeable and individually insertable or removable, and wherein each container has one dimension equal to that of the cargo space transversely and another dimension which is a proportionate dimension of the length of said space.

6. A cargo airplane as defined in claim 4 wherein each said container has a width corresponding to the width of the cargo space, wherein the depth of said container corresponds to the depth of the cargo space when the latter is closed, and wherein the lengthwise dimension of each such container is an equal proportionate part of the length of said cargo space.

7. The invention of claim 4 wherein the cover for the fuselage opening comprises relatively inward folding units which, when closed, abut in the longitudinal median of the fuselage body portion.

8. The invention of claim 4 wherein the cover for the fuselage opening is in the form of hinged units which when closed, abut medially lengthwise of the fuselage body portion, and pressure influenced downwardly-effective devices on the inner faces of said units engage on the tops of the respective containers to individually secure the latter against vertical displacement during transportation.

9. A cargo airplane according to claim 1, further including a lifting platform or skid upon which the container or containers is or are directly supported, said platform or skid being so proportioned as to engage and be restrained against shifting by the guide means during flight of the airplane; and means along opposite sides of the platform or skid for releasable connection of hold-down straps to anchor the container or containers thereon.

10. A cargo airplane according to claim 1 for reception of a container or containers having perforated lugs at intervals longitudinally of opposite sides near the top thereof; and further including a lifting platform or skid upon which the container or containers is or are directly supported; and lugs along opposite sides of the platform or skid at points corresponding to the lugs on the container or containers for attachment of hold-down shackle devices to anchor the container or containers thereto.

ALANSON O. TAYLOR.

REFERENCES CITED

The following references are of record in the file of this patent:

UNITED STATES PATENTS

| Number | Name | Date |
|---|---|---|
| 1,522,707 | Andrews et al. | Jan. 13, 1925 |
| 1,613,387 | Fitch | Jan. 4, 1927 |
| 1,747,423 | Campbell | Feb. 18, 1930 |
| 1,860,076 | Collison | May 24, 1932 |
| 1,992,941 | Fowler | Mar. 5, 1935 |
| 2,367,538 | Sullivan | Jan. 16, 1945 |
| 2,387,527 | Nagamatsu | Oct. 23, 1945 |

FOREIGN PATENTS

| Number | Country | Date |
|---|---|---|
| 167,068 | Great Britain | Aug. 4, 1921 |
| 527,663 | Germany | June 20, 1931 |